Nov. 11, 1969     M. R. FIELDS     3,477,454
FLOW CONTROL DEVICE
Filed Jan. 9, 1967     2 Sheets-Sheet 1
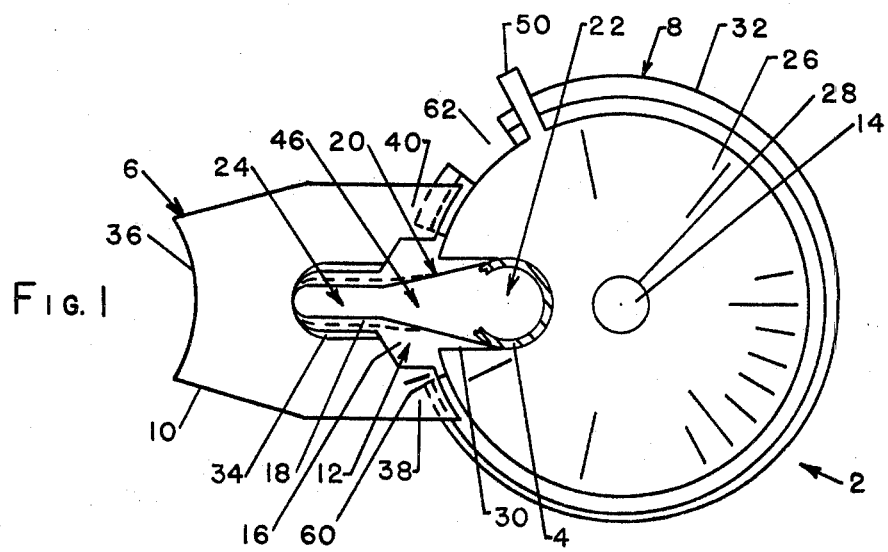
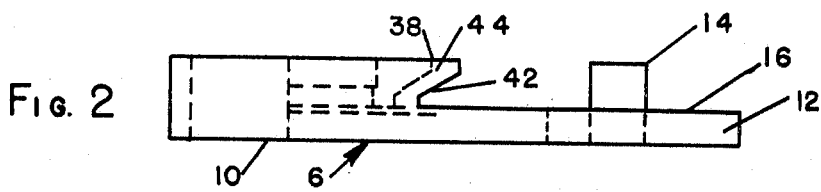
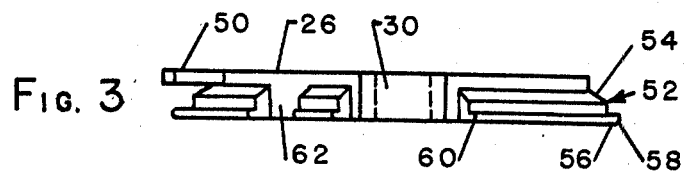
MACK R. FIELDS
*INVENTOR.*
BY *Eugene F. Malin*

Nov. 11, 1969          M. R. FIELDS          3,477,454
FLOW CONTROL DEVICE

Filed Jan. 9, 1967                    2 Sheets-Sheet 2

MACK R. FIELDS
INVENTOR.

BY *Eugene F. Malin*

United States Patent Office 3,477,454
Patented Nov. 11, 1969

1

3,477,454
FLOW CONTROL DEVICE
Mack R. Fields, Lighthouse Point, Fla., assignor to Abbott Laboratories, North Chicago, Ill., a corporation of Illinois
Filed Jan. 9, 1967, Ser. No. 608,088
Int. Cl. G05d 7/00; F16l 55/14
U.S. Cl. 137—1                  9 Claims

ABSTRACT OF THE DISCLOSURE

A flow control for a compressable tube that includes a slotted member and a rotatable cam connected to the slotted member, the slotted member flattens and immobilizes a transverse portion of the tube to prevent fluid flowing past the flattened and immobilized transverse portion and to isolate the flattened and immobilized transverse portion away from the unflattened transverse portion so as to minimize or wholly reduce any effect on the unflattened transverse portion, and the rotatable cam engages the unflattened portion to vary the size of the channel in the unflattened portion of the tube in order to provide a generally unvarying controlled fluid flow rate.

---

This invention relates to a flow control device useful in connection with compressible tubes and, more particularly, to a control device for external use on a flexible tube for regulating the fluid flow rate through the flexible tube.

As is perhaps well known, pinchcocks have been used to regulate the flow of fluid through flexible tubes. One such device, set forth in Patent Number 2,503,327 issued to M. R. Fields, is used as a disposable flow regulating device in connection with intravenous administration of liquids. This particular pinchcock includes a thin metal plate having an aperture therein with an enlarged portion which the flexible tube can pass through freely and a tapered or wedge-shaped portion for flattening the flexible tube when the plate is moved transversely across the flexible tube in order to control the fluid flow rate.

The flexible tube used in dispensing liquids for intravenous feeding, first, must be opened to fill the entire tube with the particular liquid and thereby dispel all gases from the tube, second, must be completely closed by moving the pinchcock transversely across the tube in one direction before the tube can be connected to a vein in a particular patient, and third, must be partially opened by moving the pinchcock transversely across the tube in the other direction setting an intravenous fluid flow rate to provide the required amount of fluid per unit time for the patient. Intravenous feeding may last for a relatively short time, or up to eight hours or more. The specific intravenous fluid flow rate must not vary any significant amount over a specific period of time. In the past, when flexible tubes, such as plasticized polyvinyl chloride tubes, have been utilized for intravenous feeding, a fourth step has been required in order to maintain the required constant intravenous fluid flow rate for the particular time interval. Readjustment of the fluid flow rate, the fourth step, was and still is necessary when the pinchcock is used on plasticized polyvinyl chloride tubes because such tubes are subject to cold flow when deformed. The plasticized polyvinyl chloride material flows at a rate per unit time depending upon the particular configuration of the deformity in the tube and the time lapse during which the tube is held in the deformed state. Other devices have been added to the basic Fields pinchcock to provide better incremental control of the initial setting of the intravenous fluid flow rate, for example, Patent Number 3,167,299 issued to W. C. Ling. Also, flow regulating devices have been designed to act upon a relatively large length of tubing, as shown in Patent Number 3,206,157 issued to C. R. Reading.

The present invention relates to a new and improved external flow control device for external use on a compressible or flexible tube for regulating the fluid flow rate through the channel in the tube. The device includes a first member for regulating the maximum controlled fluid flow rate through the tube and a second member for controlling intermediate fluid flow rates between the maximum controlled rate and shut off. The fluid flow rate is controlled by deforming the tube in such a manner so as to contract or limit the cross sectional area of the channel within the tube. In the preferred embodiment of the invention the first member includes a plate having an aperture with an enlarged portion and a slot leading away from the enlarged portion. The tube is threaded through the enlarged portion of the aperture. The tube may be moved relative to the plate in order to place a portion of the tube into the slot to flatten that portion of the tube and thereby regulate the maximum controlled fluid flow rate through the open channel in the unflattened portion of the tube. The second member includes a cam having a relatively thin outer edge that engages a portion of the exterior surface of the wall of the unflattened portion of the tube that lies outside of the slot. The cam is rotated to regulate the fluid flow rate between the maximum controlled fluid flow rate and shut off by varying the cross sectional area of the open channel in the unflattened portion of the tube.

It is an object of this invention to provide an external flow control device for a compressible tube that accurately regulates the fluid flow rate in a manner that generally does not vary after setting a particular fluid flow rate.

Another object of this invention is to provide an external flow control device for a compressible tube that accurately regulates the fluid flow rate by using minimal forces to collapse the tube.

Another object of this invention is to provide a flow control device that includes a member for immobilizing a transverse portion of the tube to isolate the immobilized portion away from the other portion, and anoher member for controlling the fluid flow rate in the other portion.

Another object of this invention is to provide an external flow control device for a compressible tube that accurately regulates the fluid flow rate by contacting a minimal amount of surface area of the tube and collapsing a minimal portion of the channel in the tube.

Another object of this invention is to provide a flow control device that shuts off the flow of fluid through one portion of the channel in the tube by flattening that portion of the tube to provide a maximum controlled fluid flow rate through the open channel in the unflattened portion of the tube, and to provide a generally unvarying intermediate fluid flow rate between the maximum controlled fluid flow rate and shut off by varying the cross sectional area of the open channel in the unflattened portion of the tube.

It is also an object of this invention to provide a flow control device that allows free flow of the flexible tube material when the tube is distorted in order to regulate the fluid flow rate through the channel in the tube.

A further object of this invention is to provide a disposable flow control device that may be manufactured at low cost.

An additional object of this invention is to provide a non-complex, disposable flow control devict that immobilizes one portion of a flexible tube used for intravenous feeding so that only the other portion of the tube is subject to external force applied by the flow control device to regulate intravenous fluid flow rates.

In accordance with these and other objects, which will be apparent hereinafter, the instant invention will now be described with particular reference to the accompanying drawings, illustrating the preferred embodiment of the device.

In the drawings:

FIGURE 1 is a plan view of the flow control device showing the first and second member operatively connected, with a portion of the tube, in cross section, in the enlarged portion of the aperture;

FIGURE 2 is a side view of the first member as shown in FIGURE 1;

FIGURE 3 is a front view of the second member as shown in FIGURE 1;

Figure 4:
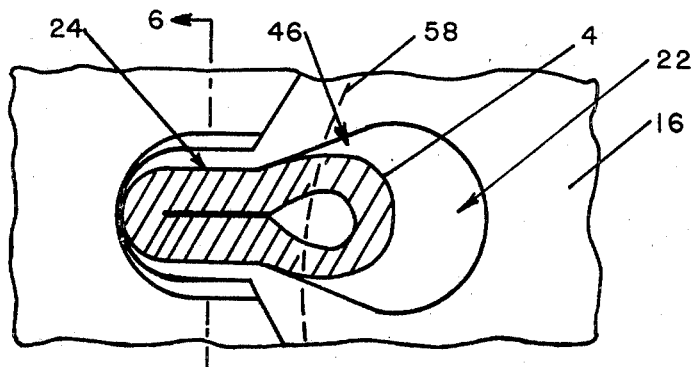
FIGURE 4 is a partial plan view of the flow control device showing a portion of the flexible tube partially flattened in the slot of the first member and an open channel in the unflattened portion of the tube.

Referring now in detail to the drawings, wherein an embodiment of the invention is shown, and particularly to FIGURE 1, the flow control device, generally designated as numeral 2, for external use on a compressible or flexible tube 4 that is preferably made from a non-corrodible material. The flow control device 2 includes a first member 6 and second member 8 for regulating the fluid flow rate in the flexible tube 4. The first member 6 includes a base 10, a recessed plate 12 partially surrounded by the base 10 and protruding from the base 10, a post 14 projecting upwardly from the upper surface 16 of the plate 12, and a lip 18 encompassing an aperture 20 in the plate 12. The aperture 20 includes an enlarged portion 22 and a slot 24 extending away from the enlarged portion for receiving the flexible tube 4. The second member includes a generally disk-shaped plate 26 with a bore 28 sized to mate with the post 14, an inlet 30 for receiving the flexible tube 4, and a cam 32 partially surrounding the disk-shaped plate 26.

Figure 6:
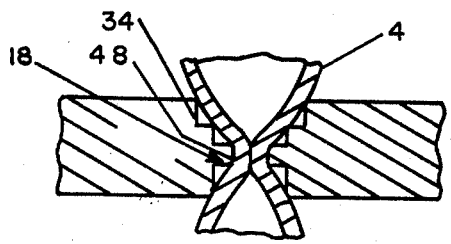
FIGURE 6 is a cross sectional view of the flow control device in FIGURE 4, taken along the lines A—A and looking in the direction of the arrows.

The base 10 is somewhat U-shaped and partially surrounds the slot 24 in the recessed plate 12. The inside wall 34 of the U-shaped base 10 may be stepped as shown in FIGURES 1 and 6. The edges of the steps aid in holding the flow control device 2 at a particular point along the length of the flexible tube 4 when the tube is in the slot 24. The edges of the steps also guide the tube longitudinally into the slot 24 in order to avoid an abrupt deformation of the flexible tube 4 along its length. The base 10 includes a thumb depression 36 at the foot of the U-shaped base and a cam retaining means 38 and 40, one cam retaining means is at the end of each stem of the U-shaped base. The thumb depression 36 provides a means for moving the flow control device 2 relative to the flexible tube 4 by grasping the tube with the index and middle finger and placing the thumb in the depression 36 and thereafter moving the fingers and thumb together. The cam retaining means 38 and 40 have a lower bearing surface 42, as shown in FIGURES 1 and 2, between the upper surface 16 of the recessed plate 12 and the overhanging guide or shelf plate, designated as numeral 44. The bearing surface 42 is shaped and spaced from the upper surface 16 to receive the cam 32 for holding the disk-shaped plate 26 in place and guiding the rotary movement of the disk-shaped plate 26. The cam retaining means 38 and 40 hold the disk-shaped plate 26 under slight pressure in frictional contact with the upper surface 16 of the recessed plate 12. Also, the cam retaining means hold the disk-shaped plate 26 in contact with the upper surface 16 of the recessed plate 12 when the cam 32 engages the flexible tube 4 for controlling the fluid flow rate.

The recessed plate 12, as shown in FIGURE 1, has an aperture 20 with the enlarged portion 22 at one end, the slot 24 at the other end and an intermediate portion 46 between the enlarged portion 22 and the slot 24. The enlarged portion 22 of the aperture 20 is circular in form having a diameter equal to or slightly less than the diameter of the outer surface of the wall of the flexible tube 4. The size of the enlarged portion 22 allows the flow control device 2 to be moved along the length of the flexible tube and fixed at a specific point along the length of the flexible tube without significantly distorting the shape of the compressible or flexible tube 4 or the channel therein.

A portion of the aperture 20 is encompassed by thin pieces of material or lips 18 projecting inwardly and having an upper surface in the same plane as the upper surface 16 of the recessed plate 12. The lips 18 have arcuate contacting surfaces 48, shown in FIGURE 6, sized to prevent cutting the compressible or flexible tube when the tube is placed in the slot 24. The contacting surfaces 48 are also sized to provide a minimal area of contact between the flow control device 2 and the compressible tube 4, so that the tube is not unnecessarily distorted.

The longitudinal contacting surfaces of the lips 18 lie parallel to one another, as shown in FIGURE 1 and 4 to 6. The perpendicular distance between the parallel contacting surfaces allows a transverse portion of the tube to be placed in the slot 24 in a collapsed or flattened state. When the tube is collapsed or flattened, a portion of the inner surface of the wall of the tube is folded over upon itself to prevent the fluid from flowing past the flattened portion of the tube. The distance between the two parallel contacting surfaces 48 is designed to provide minimal force on the transverse portion of the compressible tube in order to collapse or flatten that portion of the tube without unnecessarily distorting the tube. The distance between the two parallel contacting surfaces will vary according to the specific dimensions of the flexible tube to be placed in the aperture of the flow control device and the characteristics of the tube material.

The transverse portion of the compressible tube is immobilized in the slot, as shown in FIGURE 4, to isolate the transverse portion from the other or unflattened transverse portion. The transverse portion is immobilized in the slot to minimize or wholly reduce any effect on the other or unflattened transverse portion when it is deformed by the cam for setting a specific intermediate fluid flow rate, or shut off as shown in FIGURE 5.

Figure 5:
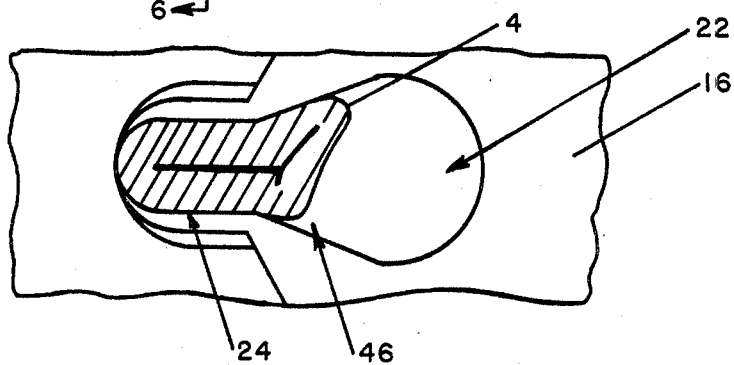
FIGURE 5 is a partial plan view as shown in FIGURE 4 showing the configuration of the flexible tube during shut off.

The length of the slot 24 and the particular configuration of the intermediate portion 46 of the aperture will determine the cross sectional area of the channel in the unflattened portion of the tube, as shown in FIGURES 4 and 5. The size of the channel in the unflattened portion of the tube as shown in FIGURE 4 determines the maximum controlled fluid flow rate through the tube. The intermediate portion 46 of the aperture 20 also aids in guiding the tube transversely into the slot 24.

Reffering now to FIGURES 1 and 3, the disk-shaped plate 26 has a bore 28, a cutout portion 30, and a handle 50. In the center of the disk-shaped plate 26 is bore 28, sized to receive the post 14. The cam is positioned interior to, or facing the mouth of the slot in the first member. The cutout portion or inlet 30 in the disk-shaped plate 26 provides an opening in the disk-shaped plate 26 for the tube 4 to pass through. When the base 10 and the disk-shaped plate 26 are assembled, the inlet 30 also allows the flexible tube 4 to be moved transversely from one end of the aperture 20 to the other end. The proximal end of the inlet 30 is generally circular, with a diameter equal to the enlarged portion 22 of the aperture 20. The width of the mouth of inlet 30 is equal to the diameter of the proximal end of the inlet. The handle 50 provides a means for grasping the disk-shaped plate 26 for rotating it in either a clockwise or counterclockwise direction about post 14.

The cam 32 includes a step 52 with a slanting upperbearing surface 54 for mating with the lower bearing surface on the cam retaining means in base 10, and a cam extension 56 encircling a portion of the disk-shaped plate 26. The outer surface 58 of the cam extension 56 is arcuate in form to prevent cutting the flexible tube 4. The outer surface 58 is also sized to provide minimal contact between the flow control device 2 and the other transverse portion or unflattened portion of the compressible tube 4. The radial distance from the center of the disk-shaped plate 26 to the outer surface 58 of the cam 32 increases in a counterclockwise direction from the leading edge 60 of the cam to a maximum radius adjacent the right side of the handle 50. The cam 32 is designed to provide minimal force on the unflattened portion of the tube to regulate intermediate fluid flow rates or shutoff.

A cutout portion 62 in the cam 32 is adjacent the left side of the handle 50, to allow the first and second members to be assembled. In order to assemble the flow control device the handle 50 is oved counterclockwise from the position shown in FIGURE 1 until the inlet 30 is in a position over the cam retaining means 38, and the cutout portion 62 is over the cam retaining means 40, then the disk-shaped member 26 may be lowered onto the post 14. It should be noted that the flow control device may be designed to place the upper surface of the lip 18 and the upper surface of the cam extension 56 in the same plane instead of in parallel planes as illustrated in the preferred embodiment.

A specific intermediate fluid flow rate may be set after a portion of the tube is immobilized in the slot, the cam may be rotated clockwise or counterclockwise from the maximum controlled fluid flow rate position to a shutoff position. The cam may include indicia thereon as illustrated in FIGURE 1. In the preferred embodiment twenty-five marks equally spaced may be used. When the cam is rotated to a position where one of the indicia is in line with the mark on the cam retaining means 38, fluid will flow through the other transverse or unflattened portion of the tube. The fluid flow rate in drops per minute may be counted, if adjustment is necessary for a particular fluid flow rate, the cam may be rotated counterclockwise a specific number of indicia, which will increase the fluid flow rate in drops per minute by a specific amount. Therefore, a specific fluid flow rate that generally does not vary may be set by reference to the indicia on the cam.

When the cam is moved clockwise, the outer surface of the cam, as shown in dotted lines in FIGURE 4, will deform the other transverse portion or unflattened portion of the tube and gradually decrease the cross sectional area of the unflattened portion of the tube. The flow control device is placed in the shutoff position when the handle 50 comes in contact with the base 10 adjacent the cam retaining means 38. When the flow control device is in the shutoff position, the flexible tube will be flattened and the channel is closed in the form of a modified T, as shown in FIGURE 5. The flow control device may be designed to close the channel in the form of a modified L.

In use, the first and second members are assembled by placing the bore 28 over the post 14, then rotating the disk-shaped plate 26 until the inlet 30 is over the cam retaining means 38, and cutout portion 62 is over the cam retaining means 40, and then moving the disk-shaped plate 26 into contact with the upper surface 16 of the recessed plate 12. The disk-shaped plate 26 is then rotated into a position, as shown in FIGURE 1, in order to prevent the first and second members from separating from one another. The flexible tube is threaded through inlet 30 in the disk-shaped plate and the enlarged portion 22 of the aperture 20. The flow control device is moved to a desired point along the length of the tube. When the flow control device 2 is utilized to regulate the fluid flow rate for intravenous feeding of liquids, the flexible tube is connected to a drip chamber or drip tube that is attached to a bottle containing the liquid. A proper level of liquid is then placed in the drip chamber, not shown. The cap on the distal end of the flexible tube is removed, allowing the liquid to flow through the tube in order to fill the tube with the liquid and thereby expel all gases in the channel of the tube. Thereafter, the flow of fluid is stopped by actuating the flow control device. A transverse portion of the tube is permanently immobilized in the slot of the flow control device and the cam is rotated clockwise against the other transverse or unflattened portion of the sube to the shutoff position. Then a needle is connected to the end of the tube and is thereafter inserted into a vein in the patient after all gases are expelled therefrom. After the connection has been completed and the tube has been taped to the patient's body, the handle 50 on the cam is moved counterclockwise to a position estimated to provide the required fluid flow rate in drops per minute for the patient. The drops per minute are counted and adjustment is immediately made, if necessary, to obtain the desired fluid flow rate. The adjustment is made by moving the handle a specific number of degrees or a specific number of indicia on the cam. The indicia indicate a specific change in drops per minute. For example, if the original position of the cam gives 70 drops per minute and the patient requires 80 drops per minute the cam will be rotated counterclockwise the distance between a specific number of indicia. The flow of fluid to the patient passes through that portion of the channel of the tube that lies in the intermediate portion 46 of the aperture. The cam does not contact or disturb the immobilized portion of the tube. Once the desired fluid flow rate in drops per minute is set, the rate will not generally vary to any significant degree.

The instant invention has been shown and described herein in what is considered to be the most practical and preferred embodiment. It is recognized, however, that departures may be made from the described embodiment within the scope of the invention. Such departures are not to be limited to the details dsclosed herein but are to be accorded the full scope of the claims so as to embrace any and all equivalent apparatus and articles.

What is claimed is:

1. A flow control device for external use on a compressible tube to regulate the flow of fluid through the channel in the tube, comprising:
   a first member for receiving the tube to collapse a transverse portion of the tube in order to prevent fluid flow past said collapsed transverse portion,
   and a second member movably connected to said first member for regulating the fluid flow rate through the channel in the other transverse portion of the tube.

2. A flow control device as set forth in claim 1, wherein
   said first member includes a pair of spaced-apart, side-by-side contact surfaces forming a slotted portion in said first member for receiving said transverse portion of the tube.

3. A flow control device as set forth in claim 2, wherein said contact surfaces are thin and are in parallel relation to one another, and said second member includes a thin contacting surface extending toward the slotted portion in the first member for contacting the compressible tube, whereby the first and second members provide minimal contact between the members and the transverse portions of the tube, and apply minimal forces to collapse the channel in the transverse portions of the tube.

4. A flow control device as set forth in claim 3, wherein
   said second member is a cam rotatably connected to said first member.

5. A flow control device as set forth in claim 3, wherein the slotted portion of the first member has a mouth and said cam is connected anterior to the mouth of the slotted portion of the first member.

6. A disposable flow control device for external use on a compressible tube to regulate the flow of a fluid through the channel in the tube, comprising: a member for contacting the tube to collapse a transverse portion of the tube, and a cam movably connected to said member for changing the cross-sectional area of the channel in the other transverse portion of the tube to regulate the fluid rate through the tube.

7. A flow control device for external use on a compressible tube to regulate the flow of a fluid through the channel in the tube as set forth in claim 6, wherein said member includes an internal edge at least partially surrounding an aperture in said member, said internal edge including a generally circular portion surrounding an enlarged opening of the aperture which allows the compressible tube to pass through the flow control device without restricting the free flow of a fluid through the tube, and another portion partially surrounding a slotted opening of the aperture for receiving a transverse portion of the compressible tube to prevent fluid flow through the transverse portion of the tube; and said cam regulating the fluid flow rate through the other transverse portion of the tube that lies outside of the slotted opening.

8. A method of regulating the fluid flow rate through the channel in a compressible tube that is generally subject to cold flow when deformed, comprising:

collapsing a transverse portion of the tube to prevent the flow of fluid past the collapsed transverse portion for setting a maximum controlled fluid flow rate through the channel in the other transverse portion of the tube, isolating the transverse portion of the tube away from the other transverse portion so as to at least minimize any effect on the other transverse portion when the other transverse portion is deformed for controlling intermediate fluid flow rates, and collapsing the other transverse portion to a particular cross sectional channel area to provide a generally unvarying controlled intermediate fluid flow rate through the channel in the other transverse portion.

9. A method of regulating the fluid flow rate through the channel in a compressible tube that is subject to cold flow when deformed as set forth in claim 8, wherein a minimal length of tube is distorted and a minimal force is utilized to effect the desired distortion of the tube when collapsing each portion of the tube without permanently deforming the tube, and collapsing and isolating the transverse portion of the tube in a single operation.

References Cited

UNITED STATES PATENTS

| | | | |
|---|---|---|---|
| 2,063,696 | 12/1936 | Oxley | 251—9 X |
| 2,092,401 | 9/1937 | Miller | 251—7 |
| 2,245,774 | 6/1941 | Gregorek | 251—9 X |
| 2,412,397 | 12/1946 | Harper | 251—7 X |
| 2,503,327 | 4/1950 | Fields | 251—7 |
| 2,709,024 | 5/1955 | Lemoine et al. | 251—4 X |
| 2,889,848 | 6/1959 | Redmer | 251—7 X |
| 3,034,504 | 5/1962 | Winsor et al. | |
| 3,167,299 | 1/1965 | Ling | 251—8 |
| 3,215,394 | 11/1965 | Sherman | 251—4 |
| 3,357,674 | 12/1967 | Coanda et al. | 251—7 |

STANLEY N. GILREATH, Primary Examiner

U.S. Cl. X.R.

251—4